Jan. 10, 1967   A. M. DONOFRIO   3,297,398
FILM STRIP HOLDER
Filed Oct. 30, 1964
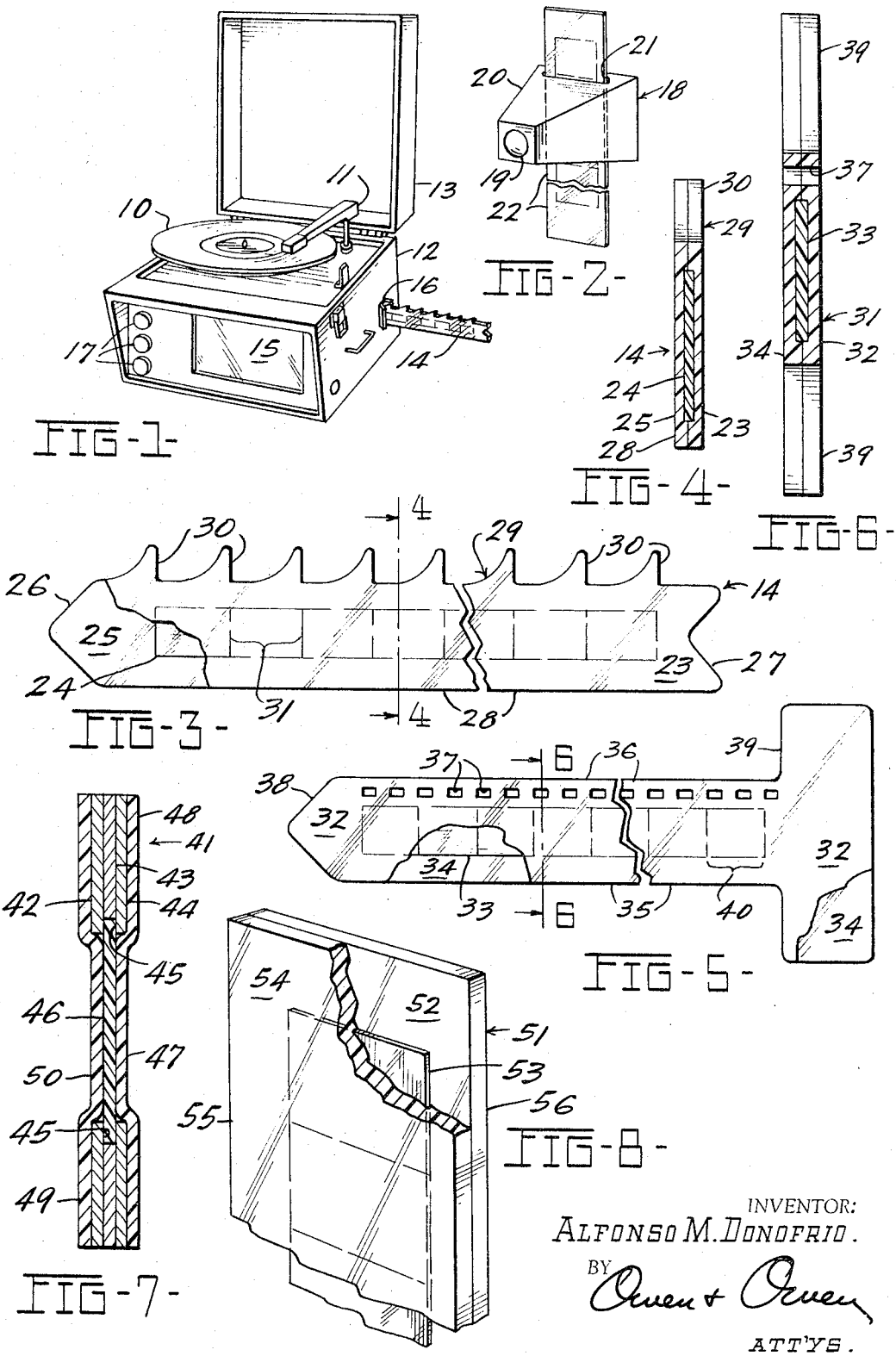
INVENTOR:
ALFONSO M. DONOFRIO.
BY Owen + Owen
ATTYS.

United States Patent Office 3,297,398
Patented Jan. 10, 1967

3,297,398
FILM STRIP HOLDER
Alfonso M. Donofrio, Toledo, Ohio, assignor to Dodge-Audio Visual Corporation, Toledo, Ohio, a corporation of Ohio
Filed Oct. 30, 1964, Ser. No. 407,681
3 Claims. (Cl. 352—232)

This invention relates to a film strip holder which is particularly designed to facilitate the handling and feeding of multi-frame strips of film and to afford protection for the image bearing strips of film from moisture, dust and damage by the fingerprints of users.

It is therefore the principal object of this invention to provide a film strip holder comprising, in effect, a laminated structure with outer sheets of transparent resinous material between which the image bearing film is mounted and thus protected.

Other and more specific objects and advantages of a film strip holder embodying the invention will be better understood from the specification which follows and from the drawings in which:

FIG. 1 is a view in perspective and on a small scale of a combination audio-visual device shown as utilizing a film strip holder embodying the invention;

FIG. 2 is a fragmentary view in perspective and on a relatively small scale of a manually held viewer illustrating how a film strip holder embodying the invention may be utilized in this fashion;

FIG. 3 is a fragmentary view in side elevation of a film strip holder embodying the invention and designed to provide for the automatic feeding thereof through a viewing or projecting device;

FIG. 4 is a vertical sectional view taken along the line 4—4 of FIG. 3 and shown on an enlarged scale;

FIG. 5 is a view similar to FIG. 3, but illustrating a second modification of a film strip holder embodying the invention as designed for the automatic feeding of film strips through a different type of mechanism;

FIG. 6 is a vertical sectional view taken along the line 6—6 of FIG. 5 and shown on an enlarged scale;

FIG. 7 is a view similar to FIG. 6 but showing a further modification of the invention which includes stiffening materials; and FIG. 8 is a fragmentary view in perspective, with parts broken away, of a film strip holder similar to the one illustrated in use in FIG. 2.

The audio-visual device shown in FIG. 1 comprises a phonograph turntable 10 and tone arm 11 which are mounted on the top of a case 12 having a lid 13. Interiorly of the case 12 there is located mechanism (not shown) by which a film strip holder, generally indicated by the reference 14, is fed through the machine and across the focal path of a projection system so as to project images of the frames of the film in the holder 14 onto a screen 15 in the front wall of the case 12. The film holder 14 is inserted into the case 12 through a suitable slot 16 in its side wall and the device is provided with suitable control knobs 17 by which the motor energizing the turntable 10, the projection bulb, and the mechanism for moving the film strip holder 14, may be energized and controlled.

In FIG. 2 there is illustrated a simple manually held viewer 18 provided with a magnifying lens 19 and a generally frusto-pyramidal case 20. Two horizontally extending slots 21 at the top and bottom of the case 20 receive a film strip holder 22 which is moved vertically through the viewer 18 as the person desires to shift from image to image on the film in the holder 22.

The film strip holder 14 embodying the invention and illustrated in use in FIG. 1 is shown in vertical side elevation and on an enlarged scale in FIG. 3. The film strip holder 14 of this embodiment of the invention comprises a first sheet of transparent resinous material 23 which has a width greater than the width of a film strip 24 and which is laminated to one side of the film strip 24. A second sheet of transparent resinous material 25 is laminated to the opposite side of the film strip 24 and, like the sheet 23, is wider than the film strip 24.

As shown in FIGS. 3 and 4, the two sheets of transparent resinous material 23 and 25 also are longer than the film strip 24 and, in this particular embodiment, are profiled to form an arrow point 26 at one end and an arrow tail 27 at the other. These shapes indicate to the user that the arrow point 26 is to be inserted into the machine, such as the device shown in FIG. 1, in order to commence a program. In addition, the two sheets of transparent resinous material 23 and 25 are sealed to each other along both sides of the edges of the film strip 24 to define a continuous straight margin 28 at the lower side of the film strip 24, and an upper margin 29 that is cut out to form a series of spaced teeth 30. The teeth 30 are spaced from each other equal distances and that distance corresponds to the length of a single frame, such as the frame indicated by the bracket and reference number 31 in FIG. 3.

A device such as that illustrated in FIG. 1 is provided with means for engaging the series of teeth 30 in timed sequence to the auditory message being presented from the record on the turntable 10 so that, as the record presents the auditory material, the film strip 14 is progressed through the device to present the images on the multi-frame film strip 24 in proper sequence and proper timing.

The embodiment of the invention illustrated in FIG. 5 is so designed that it is inserted all of the way into a viewing device in order to commence a combination auditory and visual presentation and is fed back out of the device as the program proceeds. To this end, the film strip holder consists of a first transparent sheet of resinous material 32 which is laminated to one side of a film strip 33 and a second sheet of transparent resinous material 34 which is laminated to the other side of the film strip 33. In this embodiment, the two sheets of resinous material 32 and 34 are wider than the film strip 33, forming a lower margin 35 and a upper margin 36. A series of perforations 37 is formed in the margin 36 for engagement by suitable feeding means in the device with which it is employed. As in the case of the embodiment of the invention illustrated in FIGS. 3 and 4, this embodiment of the invention also has a point 38 formed by the two sheets of resinous material where they are laminated to each other and an end bar 39, also consisting of the two sheets of transparent resinous material laminated to each other and located beyond one end of the film strip 33. The end bar 39 provides a stop for the film strip holder so that an operator may insert the film strip holder all the way into the device with which it is used until the bar 39 strikes a stop point, automatically aligning the first of the image frames, indicated by the bracket and reference number 40 in FIG. 5 with the projection system.

The film strip holder illustrated in cross section in FIG. 7 may have a side elevation like the embodiment of the invention illustrated in FIGS. 3, 5 or in use in FIG. 2, or it may have such other side elevational contour as is desired for the particular device with which it is employed. A film strip holder 41 in this embodiment of the invention comprises an extra stiffening frame, shown as consisting of three layers, for example, of cardboard or thin wood, 42, 43 and 44 which are laminated to each other and as providing longitudinally extending recesses 45 at the top and bottom to receive a strip of film 46. Although the extra frame is illustrated as being made of three laminated layers of material, it may be a single molding of but a single material, or even a single fabricated wooden strip adapted to receive and hold the film strip 46.

As in the case of the earlier described embodiment of the invention the film strip holder 41 comprises a first sheet of transparent resinous material 47 laminated to one side of the strip of film 46 and having a width greater than that of the strip of film 46. A second sheet of transparent resinous material 50 is laminated to the opposite side of the film strip 46 and cooperates with the first sheet of material 47 to form upper and lower longitudinally extending margins 48 and 49 of the film strip holder 41. While the stiffening frame 42, 43 and 44 is shown as being located between the transparent sheets 47 and 50, alternatively, the sheet material 47 and 50 may lie adjacent and layers of stiffening material may lie on the outer sides of the margins 48 and 49.

The embodiment of the invention illustrated fragmentarily in FIG. 8 is a simpler form in that it provides only a rectangular film strip holder for use, for example, with a simple manually held viewer such as the viewer 18 illustrated in FIG. 2. Of course, some automatic devices may also be able to employ a film strip holder such as the film strip holder 51 illustrated in FIG. 8, if for example, the film strip holder 51 is fed between resilient surface rollers or similar devices. The film strip holder 51 in FIG. 8 comprises a first sheet of transparent resinous material 52 laminated to one side of a multi-frame strip of film 53 and a second sheet of transparent resinous material 54 laminated to the other side of the strip film 53. As in the other embodiments of the invention the two sheets of transparent material 52 and 54 are wider than the strip of film 53 forming side margins 55 and 56 and are also longer than the strip of film 53 so that the two sheets of material 52 and 54 define the margins of the film strip holder 51 and retain the strip of film 53 between the two sheets for protection.

While the particular material out of which the outside sheets of transparent material are made is not critical to the invention, it must possess several characteristics:

(1) It must be transparent at least in the portion overlying the image bearing film strip.

(2) It must be relatively stiffer than the image bearing film.

(3) It must be capable of being sealed to itself or to additional stiffening material to form the structurally integral margins of the holder.

(4) Preferably it should be heat sealable, as by electronic sealing, or the like, along lines closely bordering the edges and ends of the image bearing film, but it may be satisfactory, if sufficient care is taken, if the material can be adhered by an adhesive or by a solvent action, providing only that neither substance is permitted to damage the image bearing film.

I have found that cellulose acetate film .003 inch to .005 inch in thickness is very suitable for the explained use, but thicker and different similar materials may also be employed as desired.

Having described my invention, I claim:

1. A holder for a transparent film strip, said holder comprising a sheet of transparent resinous material contiguous with and laminated to the entire surface of one face of said film strip and having a width greater than the width of said film strip and length at least equal to the length of said film strip, and a second sheet of transparent resinous material contiguous with and laminated to the entire surface of the other face of said film strip and having a width greater than the width of said film strip and a length at least equal to the length of said film strip, the edges of said sheets of resinous material extending beyond the edges of said film strip and being sealed to each other and defining continuous margins of said holder and retaining said film strip therebetween.

2. A film strip holder according to claim 1 and longitudinally extending strips of stiffening material bordering the sides of said film strip and bonded to the opposed faces of said sheets of resinous material.

3. The film strip of claim 2 wherein said strips of stiffening material extend slightly beyond said sides of said film strip adjacent each face thereof, thereby providing a longitudinally extending recess for the side of said film strip.

References Cited by the Examiner

UNITED STATES PATENTS

| | | | |
|---|---|---|---|
| 2,256,399 | 9/1941 | Mac Horg | 40—158 X |
| 2,335,190 | 11/1943 | Minich | 161—240 X |
| 2,527,765 | 10/1950 | Roehrl | 156—108 X |
| 2,544,844 | 3/1951 | Liber. | |
| 2,820,733 | 1/1958 | Sorel | 156—108 X |
| 2,863,244 | 12/1958 | Lyon et al. | 88—26 X |
| 2,889,647 | 6/1959 | Roman | 88—26 X |
| 3,179,004 | 4/1965 | Stoyanoff et al. | 88—28 |
| 3,207,033 | 7/1965 | Guber | 88—28 X |

NORTON ANSHER, *Primary Examiner.*

VANCE A. SMITH, *Examiner.*